United States Patent [19]

Sokolow

[11] 3,981,673

[45] Sept. 21, 1976

[54] PARISON TRANSFER MEANS

[75] Inventor: Nickolas N. Sokolow, Cheshire, Mass.

[73] Assignee: Beloit Corporation, Beloit, Wis.

[22] Filed: Sept. 25, 1974

[21] Appl. No.: 509,150

[52] U.S. Cl. ........................... 425/455 R; 294/87 R; 425/387 B; 425/DIG. 213
[51] Int. Cl.² .......................................... B29D 23/03
[58] Field of Search .......... 425/DIG. 213, DIG. 216, 425/DIG. 212, 397, 455; 294/115, 88, 87 R, 87.22

[56] References Cited
UNITED STATES PATENTS

| | | | |
|---|---|---|---|
| 2,507,127 | 5/1950 | True | 294/88 |
| 2,863,579 | 12/1958 | Meyer | 294/87 R |
| 3,353,860 | 11/1967 | Meissner | 294/115 |
| 3,438,086 | 4/1969 | Valyi | 425/3 |
| 3,525,123 | 8/1970 | Cines et al. | 425/DIG. 216 |
| 3,765,813 | 10/1973 | Moore | 425/174 |
| 3,833,700 | 9/1974 | Adomaitis | 425/DIG. 212 |
| 3,863,753 | 2/1975 | Shank, Jr. | 294/115 |

*Primary Examiner*—Francis S. Husar
*Assistant Examiner*—Carl Rowold
*Attorney, Agent, or Firm*—Dirk J. Veneman; Bruce L. Samlan; Gerald A. Mathews

[57] ABSTRACT

An apparatus for transferring parisons from an oven to a blow mold has the capability of straightening up tilted parisons and gripping them uniformly without flattening the ends. The apparatus includes a gripper with jaws which open wide when opened, thereby providing an entry space between the jaws for a tilted parison as well as an upright parison and which in the closed position form an essentially complete circle about the parison to uniformly grip the same in cooperation with a push piece which moves into the open end of the parison.

4 Claims, 5 Drawing Figures

U.S. Patent  Sept. 21, 1976  Sheet 1 of 2  3,981,673
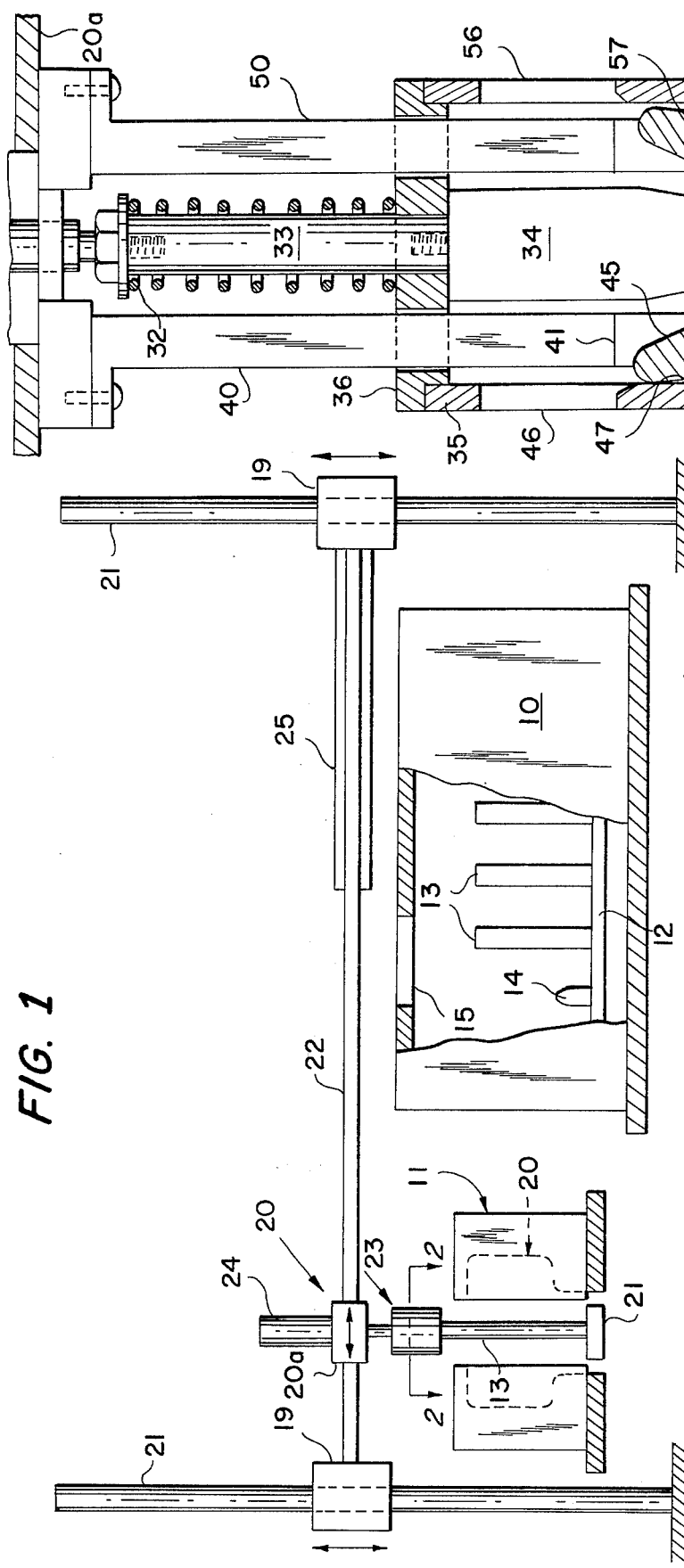
FIG. 1
FIG. 3
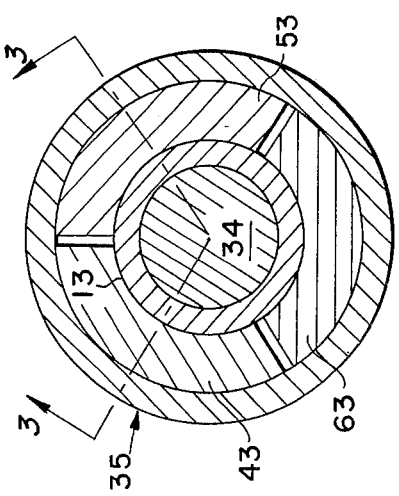
FIG. 2

PARISON TRANSFER MEANS

BACKGROUND OF THE INVENTION

This invention relates to blow molding, and in particular it relates to a transfer means for handling a parison in connection with the cold parison technique.

Tubular parisons are formed and heated to a temperature suitable for blow molding in two ways. According to one procedure, a parison is extruded in a hot state and while still hot it is carried over to the blow mold. In accordance with another procedure, the extruded parisons are cooled and/or stored for use at a subsequent time and/or place. This latter procedure is referred to as the "cold parison" procedure because it starts with a cold (i.e., room temperature) parison which must be heated in an oven or the like to a temperature suitable for blow molding after which it must be transferred from the oven to the blow mold. The present invention is concerned in particular with the cold parison procedure and more specifically with the task of transferring a parison which has been heated in an oven from the oven to the blow mold. A suitable method and apparatus for carrying out the cold parison technique is described in detail in commonly owned U.S. Pat. No. 3,765,813, issued Oct. 16, 1973, and the disclosure of which is incorporated by reference herein for details of a typical cold parison technique.

In a parison heating oven such as the type shown in the said patent, the parisons are supported in an upright position on carrier pins as they travel through the oven. The oven is designed and operated such that as the parisons reach the suitable forming temperature they arrive at a discharge station at which a transfer means having some type of gripping structure enters the oven from above through an opening, grips a properly heated parison, removes the parison upwardly out of the oven and then transfers the parison laterally to the blow mold whereat the parison is lowered. In the type of operation with which the said previous patent is concerned, the parison is stretched for biaxial orientation by gripping the lower end of the parison in the vicinity of the blow mold and then raising the gripping means. Hence, the gripper means has a dual function of at least gripping the parison at the oven and removing it therefrom and also assisting in stretching of the parison.

Certain problems have been encountered in carrying out these functions with previously known gripper means. One problem has been that on numerous occasions as the parisons within the oven arrive at the discharge station they are tilted to one side rather than in the desired upright position. Previously known gripper means which were designed primarily for receiving and gripping a properly positioned upright parison would tend to either miss this parison altogether or pick it up in a tilted condition. In either case the result would be a reject. If the parison were not picked up at all it would have to be removed and recycled; and if the parison were picked up with a tilted orientation it would arrive at the blow mold improperly oriented so that it would not be gripped and stretched in the desired manner.

Another difficulty has concerned the type of known gripper means having a pair of opposed planar jaws. This type of gripper means closes the upper end of the parison by flattening the upper end. When the parison is gripped in this manner, as the gripper means moves upwardly during the stretching operation, stretching will not be applied uniformly about the periphery of the parison.

Thus, there exists a need for a new and improved means for handling a parison in connection with the cold parison technique.

SUMMARY OF THE INVENTION

Thus, it is a purpose of the present invention to provide a new and improved apparatus for handling a parison in connection with the cold parison blow molding technique.

This purpose is achieved in accordance with the present invention by providing a gripper means constructed and arranged not only to receive a properly positioned upright parison but also to receive and straighten up a tilted parison before gripping the same. This is accomplished by providing an arrangement having a plurality of gripper jaws which in the closed position form essentially a circle about the parison and which cooperate with a push piece which enters the upper opened end of the parison, the upper end of the parison thereby being firmly gripped between the jaws and the push piece. The ability of the jaws to receive and straighten up a tilted parison results from the arrangement of the jaws whereby they move essentially horizontally from the closed position to a wide opened position, which wide opening is then capable of moving down over a wide area which is most likely to contain the upper end of most tilted parisons as well of course as a properly positioned upright parison. As the jaws move inwardly essentially horizontally they will tend to straighten up the tilted parison after which the push piece is moved into the open end of the parison to cooperate with the jaws in the manner described above.

In accordance with a preferred embodiment, a plurality of rods extend downwardly from the main carriage of the transfer means, each rod having a jaw connected thereto for pivotal movement about a horizontal axis for movement between the opened and closed positions. The arc of this pivotal movement is sufficiently great such that the jaw itself can accurately be described as moving in a generally horizontal direction although in a technical sense it is of course moving in an arc about its pivotal axis. A push piece extends downwardly from the carriage between the jaws and a power means such as a fluid operated piston and cylinder unit may be provided for moving this push piece upwardly and downwardly.

An important feature of the present invention is the cooperation between the movement of the jaws and the movement of the push piece. In accordance with a preferred arrangement, this is accomplished by providing a holding ring surrounding the jaws, this holding ring being spring biassed downwardly from a fixed element on the push piece, whereby movement of the power operated push piece will also cause movement of the holding ring. This holding ring is then provided with strategically located surfaces which cooperate with cam surfaces on the jaws to cause opening and closing of the jaws during certain vertical movements of holding rings.

In the final closed position the jaws are closed and the push piece has entered the upper end of the parison. In this position the said upper end of the parison remains essentially circular rather than flat, thereby providing the advantage that the forces associated with the stretching operation are applied to the parison uniformly about its circumference.

Thus, it is an object of the present invention to provide a new and improved transfer means for use in connection with the cold parison blow molding technique.

It is another object of this invention to provide a new and improved transfer means having a gripper means capable of straightening up a tilted parison before removing the same from the oven.

It is still another object of this invention to provide a new and improved transfer means having a gripper means capable of gripping the upper end of a parison circularly rather than in a flat manner, thereby assuring that forces of the stretching operation are applied to the parison uniformly about its circumference.

It is still another object of this invention to provide a new and improved transfer means having a gripper means including a plurality of jaws which grip the parison in essentially a circle, in cooperation with a push piece which enters the open end of the parison to cooperate with the jaws.

It is still another object of this invention to provide a new and improved transfer means having a gripper means including a plurality of jaws and a pusher piece and including a means such as a closing ring interrelated to both the jaws and the pusher piece so that the movements of one are closing interrelated to the movements of the other.

Other objects and advantages of the present invention will become apparent from the detailed description to follow, together with the accompanying drawings.

BRIEF DESCRIPTION OF THE DRAWINGS

There follows a detailed description of a preferred embodiment of the invention provided for illustrative purposes and which is to be read together with the accompanying drawings in which:

FIG. 1 is a schematic elevational view, partially cut away, showing a portion of a cold parison blow molding apparatus incorporating the features of the present invention.

FIG. 2 is an enlarged cross-sectional view of a gripper means constructed in accordance with the features of the present invention and is taken in a plane generally represented by the line 2—2 of FIG. 1.

FIG. 3 is an enlarged cross-sectional view of a gripper means taken along line 3—3 of FIG. 2 and showing the apparatus in an opened position relative to an upright and a tilted parison.

The plane in which FIG. 2 is taken is also shown by the line 2—2 in FIG. 4.

DETAILED DESCRIPTION OF THE PREFERRED EMBODIMENT

Figure 5:
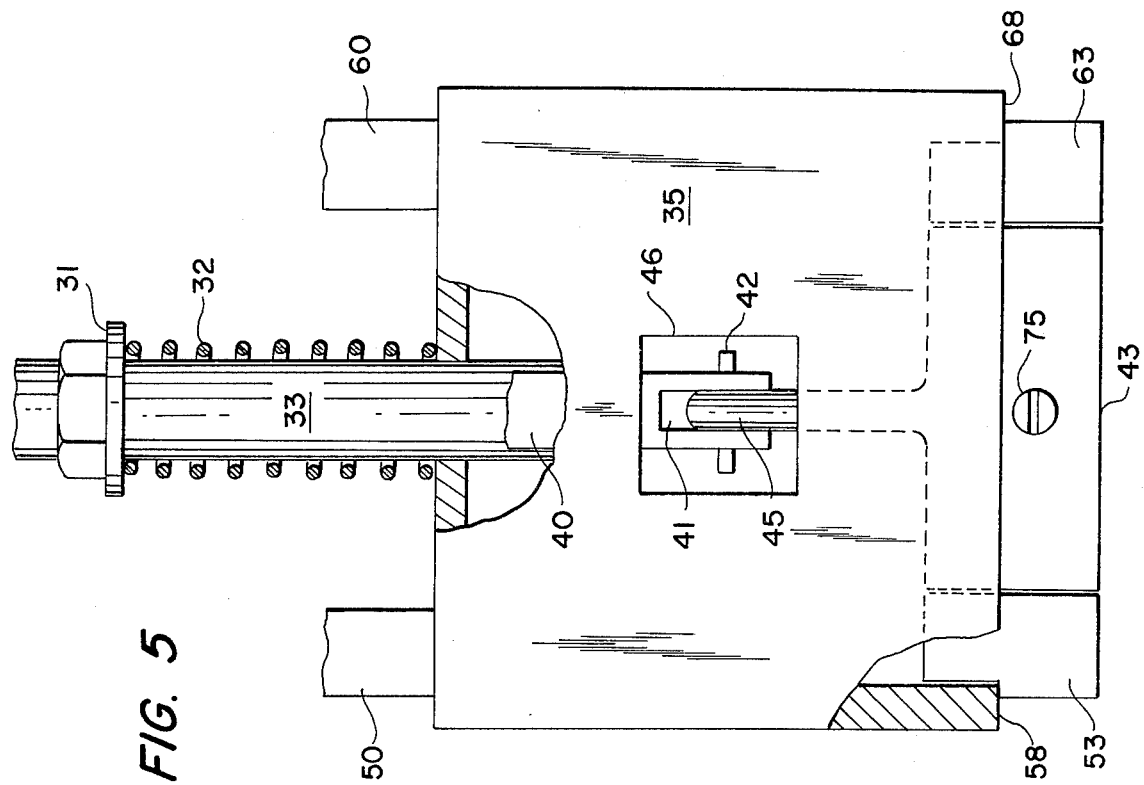
FIG. 5 is a partial side elevational view taken in the direction of the arrow A of FIG. 4, with portions cut away.

Referring now to the drawings, like elements are represented by like numerals throughout the several views.

Referring to FIG. 1, there is shown a parison heating oven 10 and a blow mold station 11. The oven 10 is provided for uniformly heating parisons from room temperature or the like up to a suitable blow molding temperature. This oven 10 may be of the type shown in the above noted patent. This type of oven includes an endless carrier 12 having a number of carrier pins 14 affixed thereto for carrying a plurality of parisons 13 through the oven. These parisons are loaded into the oven at a loading station (not shown) and when they reach the proper temperature for blow molding, they move beneath an opening 15 through which the heated parisons are removed.

The apparatus further includes a transfer means for transferring the heated parisons from the oven 10 to the blow mold 11. This transfer means may take many forms, one example of which is that shown in the said patent which includes a vertical movable and rotatable transfer arm. Another arrangement, which is illustrated in the present case includes a plurality of posts 21 on which bearing members 19 are mounted for vertical movement. One or more horizontally extending rods 22 extend between and are connected to these bearing members 19, and a carriage 20 is mounted on the rods 22 for movement therealong under the action of a hydraulic piston and cylinder unit, the piston of which is visible at 25 in FIG. 1. Also shown schematically in FIG. 1 is the gripper means 23, the details of which will be explained in greater detail below, and a fluid operated piston and cylinder unit 24 located above the carriage portion 20a of the carriage 20. Hence, by a combination of vertical movement along posts 21 and horizontal movement along rods 22, it will be seen that the carriage 20 can easily move between the oven and the blow mold and vertically at both locations.

Referring now to FIGS. 2 through 5, the improved gripper means of the present invention will be described in greater detail. A piston rod 30 extending downwardly from the cylinder 24 is threadedly connected at 30a to a connecting rod 33 which forms the upper portion of a push piece, the lower portion 34 being threadedly connected to 33 by means of threads 33a so that the piece 34 can be removed and exchanged for another piece of a different size for handling a different size parison. Fixed onto the upper end of rod 33 by means of nut 37 is a flange 31, against the bottom of which a spring 32 acts.

A feature of the present invention is that the closing jaws form essentially a circle in the closed position. This can be accomplished by any number of jaws. However, as a minimum, in order to accomplish the purpose of catching a tilted parison and moving it back toward the upright position, there should be three jaws. Each jaw is operatively connected to a fixed vertical rod extending downwardly from the carriage portion 20a of the carriage 20. If there are three jaws as in the present illustration, then there would be three rods equiangularly spaced about the central axis of the device. In the present case these would be the rods 40, 50 and 60. To simplify the present description, all of the jaw structure elements associated with the rod 40 include numbers in the 40's while corresponding elements associated with the rods 50 and 60 utilize corresponding numerals in the 50's and 60's, i.e. with the last digit the same. In view of this, and since all of the elements associated with each of the rods, 40, 50 and 60 are essentially identical, only one of the rods, namely the rod 40 and its associated jaw structure will be described in detail.

Figure 4:
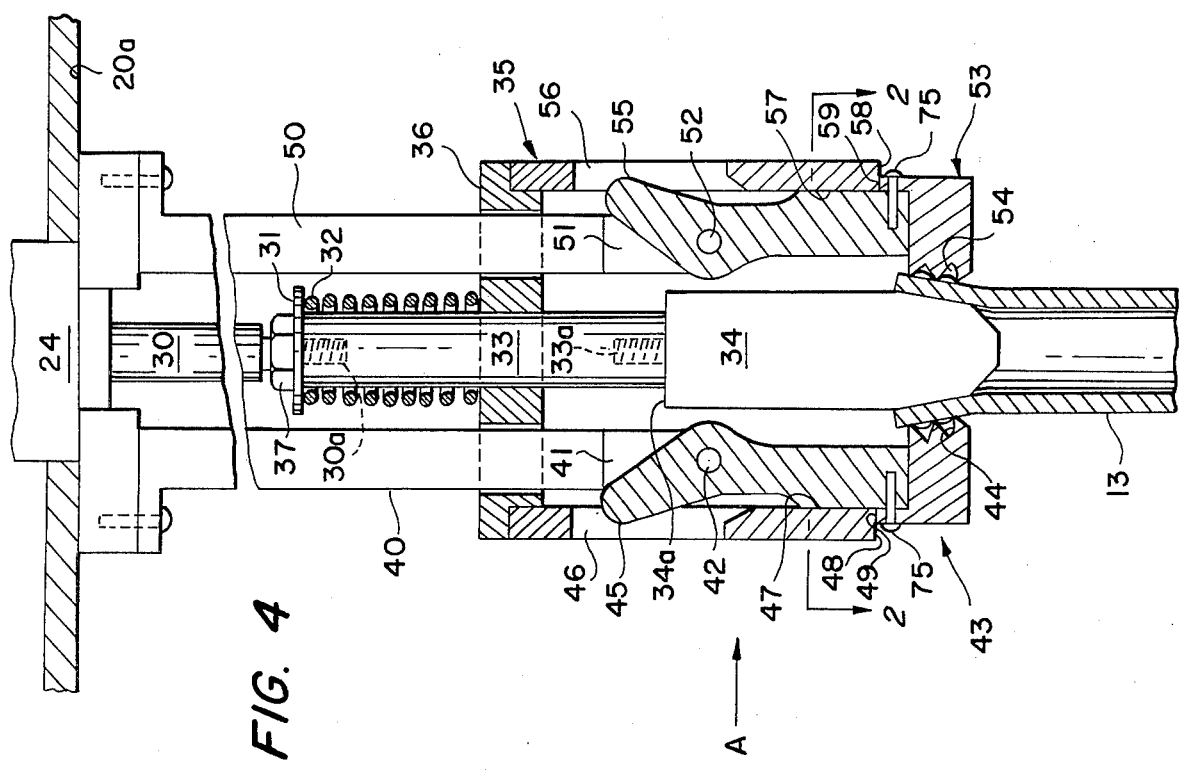
FIG. 4 is a cross-sectional view similar to FIG. 3 but showing the parts in a closed position.

At its lower end the rod 40 is bifurcated at 41 to receive the upper end 45 of a closing jaw 43, the bifurcated end being connected to the portion 45 by a pivot pin 42, whereby the jaw structure 43 can pivot about the horizontal axis of pin 42. At its lower end, the jaw structure 43 is enlarged as best shown in FIGS. 2 and 5 so as to take up approximately 120° so that all three portions 43, 53 and 63 form essentially a circle engaging the exterior of the parison 13. As best shown in FIGS. 3 and 4, these portions 43, 53 and 63 include serrated teeth for firmly grasping the parison.

The jaws are surrounded by a closing ring 35 generally cylindrical in shape which is closed at its upper portion by a plate 36 having apertures therein for the rods 40, 50 and 60 as well as a central aperture for the rod 33. The lower end of spring 32 acts against the upper surface of plate 36. The closing ring 35 includes three apertures, one for each of the upper portions of the closing jaws. The recess 46 for the portion 45 is visible in FIGS. 3 through 5 while the recess 56 for the portion 55 is visible in FIGS. 3 and 4. There is also of course a corresponding recess for corresponding upper portion of the jaw 63, although this does not appear in the drawings.

The various elements are interrelated in the following manner so that movement of the rod 33 will cause specified movements of the closing ring 35 hence also of the jaws 43, 53 and 63. Firstly, it will be noted that the ring 35 is connected to the rod 33 only via the aperture in plate 36 and the spring 32. The plate is caused to move upwardly when an upper shoulder 34a on the push piece 34 engages the lower surface of plate 36 adjacent the aperture therethrough for urging the plate 36 and hence also the ring 35 upwardly. Compare FIGS. 3 and 4. Further, as the push piece 34 moves downwardly the spring 32 causes the elements 35 and 36 to move downwardly with it.

The element 35 cooperates with the closing jaws in the following manner (once again referring specifically to the closing jaw 43 since the other two closing jaws operate in a similar manner). As is evident in FIG. 3, when the ring 35 is in a raised position relative to the closing jaws, the inside surface 47 of ring 35 acts against the portion 45 turning the closing jaw about the axis of pivot pin 42 to the opened position as shown in FIG. 3. The jaws are now in an open position spaced quite far apart, thereby leaving ample room for receiving a tilted parison as shown at 13' in FIG. 3. The ring 35 is then lowered, whereby this inner surface 47 passes beneath the portion 45, permitting the latter to move outwardly through recess 46 while acting against the rear surface 47a of the closing jaw 43, causing it to move inwardly to the closed position as shown in FIG. 4. Downward movement of closing ring 35 is limited by engagement of the bottom 48 of the ring 35 against a horizontal ledge 49 on the closing jaw 43. Once this downward limit position of the ring 35 has been reached, it is evident that the push piece 34 can continue to move downwardly to enter the parison as shown in FIG. 4.

It is evident that the size of the jaws 43, 53 and 63 as well as the diameter of the lower portion 34 of the push piece are dependent on the size of the parison being transferred. At different times, different sized parisons are used. To therefore adapt the present invention for use with different sized parisons, the present invention includes means for changing the size of the push piece and the jaws. As mentioned earlier, the push piece 34 is removably connected via threads 33a to the rod 33 so that it can easily be removed and replaced by a push piece of a different size. The jaws 43, 53 and 63 are each made in two parts, the lower parts being connected to the upper parts by means of bolts 75. Hence, by simply removing the bolts 75 the lower portions can be removed and replaced by lower portions of different sizes.

The operatiton of the present invention is as follows. When a parison 13, now properly heated to the forming temperature, moves beneath the opening 15, the carriage 20 is manipulated by the necessary vertical movement of bearing members 19 on posts 21 and horizontal movement of carriage 20 on rods 22 so that the carriage is located over the opening 15 and lowered into the opening so that the gripper means shown schematically at 23 in FIG. 1 is lowered down to the upper end of the parison 13 to be removed. The position of the elements at this time is as shown in FIG. 3. The piston within cylinder 24 is raised, thus raising the rod 33 and the push piece 34 as well as the ring 35. At this point, the operation will be described specifically with respect to its action on the closing jaw 43, it being understood that an identical action takes place with respect to the closing jaws 53 and 63. As the elements 33 and 34 move downwardly, first of all the inner surface portion 47 of ring 35 moves beneath the portion 45 and engages the back 47a of the jaw 43. This causes a turning movement of the jaw 43 about the axis of pin 42 to the closed position as shown in FIG. 4. Downward movement of the ring 35 is limited as the bottom portion 48 of the ring engages the ledge 49 of the closing jaw 43. However, even after this downward movement of the ring 35 has been limited, the push piece 34 continues moving downwardly to enter the upper end of parison 13 as shown in FIG. 4. A firm grip of the parison is then achieved as the tapered lower end of push piece 34 flares the parison outwardly and urges the material of the parison into the serrations of the jaws 43, 53 and 63. Once again by proper manipulation of the bearing members 19 along posts 21 and horizontal movement of the carriage 20 along the rods 22 the parison is carried over to the blow mold 11 whereat the lower end of the parison is firmly grasped within a thread die clampp 21 (which is shown in detail in the said patent). With both the lower and the upper ends of the parison thus firmly held by clamp 21 and gripper means 23, respectively, the carriage 20 is raised by moving the bearing members 19 upwardly along posts 21, thereby stretching the parison. As mentioned earlier, it is an important feature of the present invention that this important stretching step will be significantly improved as compared with the stretching step when carried out with a gripper means which pinches closed the top of the parison. In the present case, unlike the previous case, since the upper end of the parison remains in a circle and is not flattened the forces exerted throughout the parison by the stretching operation will be exerted uniformly about the circumference of the parison. In the conventional manner, after stretching has been completed, the halves of blow mold 11 will close onto the parison. As explained in the said patent, this closing movement will pinch off the top of the parison, and the clamp 21 includes an air plug therethrough for introducing air into the parison. The small portion still held by gripper 23 then constitutes scrap which will subsequently be discarded before the gripper means 23 returns to the oven to receive another parison.

Although the invention has been described in considerable detail with respect to a preferred embodiment, it will be apparent that the invention is capable of numerous modifications and variations apparent to those skilled in the art without departing from the spirit and scope of the invention as defined in the claims.

I claim:

1. A transfer apparatus for transferring an open ended tubular parison from an oven to a blow mold comprising:
   a gripper means for gripping the upper edge of a tubular parison, said gripper means including
   at least three jaws which, in the closed position, form essentially a circle closely surrounding the parison, said jaws being movable essentially horizontally and radially outwardly from the closed position a distance sufficient to receive between them the upper end of a tilted parison and for closing onto said tilted parison to center it to a proper upright position as the jaws move to the closed position; said jaws being mounted for pivotal movement about a horizontal axis located thereabove;
   a vertically movable ring member having operative surfaces positioned to engage the jaws upon vertical movement relative to the jaws to open and close the jaws;
   a push piece having a tapered lower end; means for positioning the push piece for vertical movement into the opened upper end of the centered parison to firmly secure the parison between the jaws and the push piece including a vertical rod, said push piece forming the lower end of said rod and said ring member being cylindrical and having an upper support surface and surrounding the rod and being movable vertically relative to the rod;
   means associated with said ring member limiting both the downward and the upward movement of the ring member relative to the push piece;
   resilient means acting between the rod on the push piece and the ring support surface urging the ring to its lowermost position relative to the push piece, at which lowermost position the jaws are opened, and from which position upward movement of the ring relative to the push piece opposes the resilient means and causes the jaws to close.

2. A transfer apparatus according to claim 1, said support surface comprising a plate extending across the top of the cylindrical ring member, and said resilient means being a spring acting between the said support surface and a flange integral with the rod on the push piece.

3. A transfer apparatus according to claim 1, including a carriage, one vertical rod for each of said jaws fixed to the carriage and extending downwardly therefrom through openings provided therefor in the support plate, the jaw associated with each rod being pivotally connected thereto for pivotal movement about a horizontal axis.

4. A transfer apparatus according to claim 3, said jaws having a rear surface intermediate their vertical lengths engageable with the inside of the movable ring member for closing the jaws, and an outwardly projecting upper surface engaging with the same part of the inside of the ring member when the ring moves upwardly relative to the jaws for opening the jaws.

* * * * *